June 7, 1949.  C. B. GASH  2,472,474
LATCH
Original Filed Aug. 26, 1944
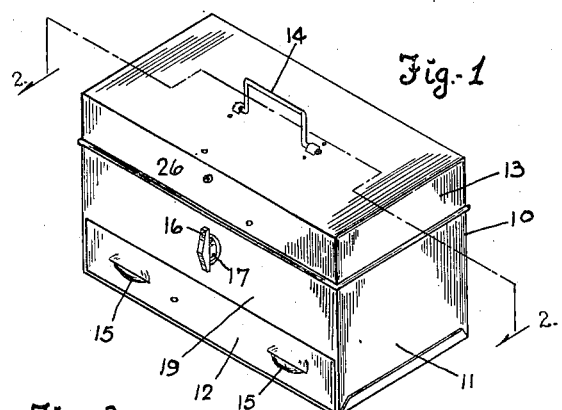
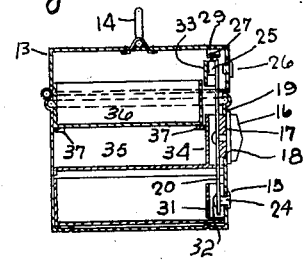
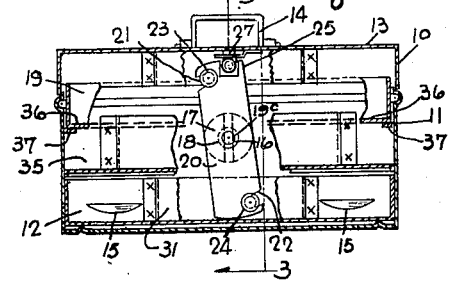
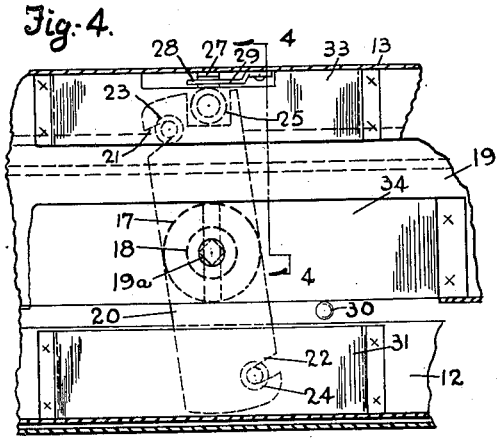
CHARLES B. GASH
INVENTOR
BY Joshua R. H. Potts
his attorney Patented June 7, 1949

2,472,474

UNITED STATES PATENT OFFICE 2,472,474

LATCH

Charles B. Gash, Oak Park, Ill.

Original application August 26, 1944, Serial No. 551,371. Divided and this application September 7, 1945, Serial No. 615,002

2 Claims. (Cl. 292—120)

The present invention relates to fishing tackle and other boxes, and latches and locks therefor. It has particular reference to the provision of an improved box and improved latching and locking means for the box. Every fisherman is familiar with the habit of tackle boxes opening up and spilling all the contents, and not infrequently into the water.

The present application is a division of the subject matter of application, Serial No. 551,371, filed by the present applicant on August 26, 1944, now Patent Number 2,440,541 dated on April 27, 1948.

The present application relates to latching means.

One of the objects of this invention is to provide a box which will insure against any such thing happening. An advantage of the fishing tackle box of my invention is that it has a bottom drawer which opens by being pulled out horizontally at the front, and the box in its preferred form has a swinging latch whereby the drawer and the lid when closed may be latched, so that when the bottom drawer is latched, the lid, also, is latched and vice versa. The weight of the latch is applied off-center so as to prevent the latch from swinging accidentally to unlatched position when unlocked.

I, also, provide a lock which is preferably permanently attached to the latch, operated by a key which, when locked, prevents the swinging latch from turning out of its locked position.

Another object and advantage of my invention is the provision of such a construction which is easily assembled and inexpensive to construct.

Further objects and advantages will appear and be brought out more fully in the following specification, reference being had to the accompanying drawing, in which:

Fig. 1 is a perspective view of the box;

Fig. 2 is a vertical section, taken on the line 2—2 of Fig. 1;

Fig. 3 is a vertical section, taken on the line 3—3 of Fig. 1;

Fig. 4 is an enlarged detail of the swinging latch and lock; and

Fig. 5 is a detailed sectional view, taken on the line 4—4 of Fig. 4.

Referring to the drawings in detail, in which I have shown the preferred form utilizing the principles of my invention, a box 10 has a body portion 11, a drawer 12, and a lid 13 hinged to the body, having the usual handle 14. The drawer 12 may also be provided with handles 15, and opens by pulling the same outwardly to the front in a horizontal manner.

Another handle 16 is secured to a disk 17 extending through a cut-out 18 in the front portion 19 of the body of the box, and mounted on a square post 19a.

This disk is located on its other side next to a swinging locking latch 20 which has a cut-out 21 and another cut-out 22 at diagonally opposite corners of the latch, in which pins 23 and 24, respectively, are adapted to be received, to limit the movement of the latch, as will be readily understood. The square post 19a extends through a square hole 19b in the latch and the latch 20 is retained on the post 19a by a head 19c, so that the handle may turn the latch.

The latch 20 has mounted thereon a common lock 25. A key is adapted to be inserted in a keyhole 26 in the lid to operate a bolt 27.

The bolt 27 is adapted to move into and out of a slot 28 in an offset bifurcated plate 29 on the lid 13. I, also, have provided a stop pin 30 in the inside face of the body of the box which limits the swinging movement of the latch 20 clockwise looking at Figs. 2 and 4 of the drawings in contradistinction to the pins 23 and 24 which limit the movement of the latch 20 counter clockwise.

I have also provided a housing 31 on the inside of the drawer which serves to separate the contents of the drawer from the working parts of the latch and may serve, also, to insure against the drawer opening when it is supposed to be in locked position.

It will be manifest from the foregoing that when the latch 20 is in the position shown in Fig. 4, the lid cannot be lifted because of the engagement of the latch with the pin 23. Also, the drawer cannot be pulled out because of the abutment of the head 32 of the pin 24 in the drawer front against the latch 20. With latch 20 in closed position, the box can be carried even without using the key for lock 25. This in itself is one of the new features of the invention as, in addition, it eliminates the usual outside hardware such as clamps or latches—and will cut down the cost of manufacture.

It will also be observed that I have provided another housing 33 for the lid to keep the contents away from the working parts.

When the latch is in the position shown in Figs. 2 and 4, it will tend to remain in this position as the weight of the latch is arranged in such a manner that the latch is off the vertical axis through the pivot in the form shown in Figs. 2 and 4.

There is also a housing 34 for the swinging locking latch 20. While the latch is in the last-mentioned position, it may be again locked by means of the key which will cause the bolt 27 to engage in the slot 28 in the clip of the lid. This will prevent handle 16 from being turned. A fortiori, the contents will be securely locked in this position also.

In order to open the box, it is necessary not only to operate the key to remove the bolt from the slot 29, but also to take hold of the handle 16 and swing it in a counter-clockwise manner as seen in Figure 1 until it reaches a horizontal position with the lower side of the upper part of the latch resting against the stop pin 30.

The portion of the box behind the housing 34 constitutes a false tray 35 and an actual tray 36 may rest on lugs 37 above false tray 35.

The operation of the device and its advantages should be manifest without further description.

While I have illustrated and described the preferred form of construction for carrying my invention into effect, this is capable of variation and modification without departing from the spirit of the invention. I therefore, do not wish to be limited to the precise details of construction set forth, but desire to avail myself of such variations and modifications as come within the scope of the appended claims.

Having thus described my invention, what I claim as new and desire to secure by Letters Patent is:

1. Latch means for simultaneously holding a first member against rectilineal movement and a second member against swinging movement on an axis spaced from and substantially parallel to said first member with the axis normal to the direction of movement of said first member, said latch means comprising a lever, means to pivotally mount said lever between said members, said lever being formed with a notch on one edge adjacent to one end and a notch on the opposite edge adjacent to the other end, a headed pin on said first member and received in one of said notches, a pin on said second member received in the order of said notches, and an operating member for the lever associated with said pivotal mounting for rotating said lever to simultaneously cause engagement or disengagement of said pins in said notches.

2. Latch means for simultaneously holding a first member against rectilineal movement and a second member against swinging movement on an axis spaced from and substantially parallel to said first member with the axis being arranged normal to the direction of movement of said first member, said latch means comprising a lever, a pivotal mounting for said lever between said members, elements of an interlocked connection on one end of said lever and said first member, elements of another interlocked connection on the other end of said lever and said second member, and means associated with said pivotal mounting for rotating said lever to simultaneously make and break said interlocked connections.

CHARLES B. GASH.

REFERENCES CITED

The following references are of record in the file of this patent:

UNITED STATES PATENTS

| Number | Name | Date |
|---|---|---|
| 276,886 | Rudolph | May 1, 1883 |
| 944,360 | Gregson | Dec. 28, 1909 |
| 1,360,839 | Wentsch | Nov. 30, 1920 |
| 2,249,438 | Smith | July 15, 1941 |
| 2,440,541 | Gash | Apr. 27, 1948 |